(No Model.)
J. C. ROSSI.
PRODUCTION OF COLD.
No. 284,068. Patented Aug. 28, 1883.
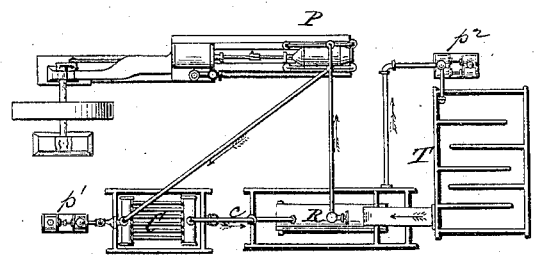
Witnesses:
Geo. W. Miatt
Joseph L. Levy
Inventor:
James C. Rossi,
By his Attorney,
Henry L. Brevoort

UNITED STATES PATENT OFFICE.

JAMES C. ROSSI, OF PERTH AMBOY, NEW JERSEY.

PRODUCTION OF COLD.

SPECIFICATION forming part of Letters Patent No. 284,068, dated August 28, 1883.

Application filed February 7, 1883. (No model.)

*To all whom it may concern:*

Be it known that I, JAMES C. ROSSI, a citizen of the United States, residing at Perth Amboy, in the county of Middlesex and State of New Jersey, have invented certain new and useful Improvements in the Production of Cold, of which the following is a full, clear, and exact description.

My invention relates to that method for the production of cold for the manufacture of ice and for general refrigerating purposes in which the alternate volatilization and condensation of a binary liquid extracts heat from that which it is desired to cool directly or indirectly.

In the method referred to the binary liquid, which consists of the vapors of a highly-volatile liquid absorbed by a liquid less volatile, but having the characteristic of absorbing large quantities of the vapor of the more volatile liquid, is placed in the refrigerating-chamber of a suitable apparatus, in which it is caused to expand and volatilize spontaneously by a decrease in pressure created by a double-acting pump, which subsequently forces the vapors thus created into a condenser, in which the absorbing-liquid is liquefied and absorbs the vapors of the more volatile liquid, thus again forming the binary liquid, which is again volatilized when cold is to be produced, and so on continuously.

The main advantage obtained by the use of a binary liquid over other systems consists in the fact that the pressure to which the vapors are subjected in the condenser need only equal that requisite to liquefy the vapor of the absorbent liquid. The liquid thus re-formed immediately reabsorbs the more volatile vapor, which otherwise could only be independently reduced to a liquid form by the application of a comparatively high degree of pressure, thus rendering unnecessary very powerful compression apparatus and hermetically-closed receivers of great strength, indispensable in other systems, owing to the great elasticity and tension of the vapors to be overcome. In other words, the great affinity of the absorbent liquid for the more volatile gas is utilized in condensing the latter in lieu of mechanical pressure. This system of a binary liquid has been patented in the United States in Patent No. 224,246, dated February 3, 1880, and in other subsequent patents. In connection with this system the binary liquid usually employed has consisted of ordinary ether as the absorbent, and the more volatile liquid has been sulphurous dioxide. This combination gives satisfactory results within certain limits; but much superior results might be obtained provided a more volatile liquid or gas could be substituted for the sulphurous dioxide, and numerous attempts have been made in this direction. Ammonia is especially adapted for use in this connection, since while vaporizing it will absord and render latent fully five times more heat than either ether or sulphurous dioxide, or a compound of both, would under like circumstances; but heretofore no suitable absorbent has been discovered which could be advantageously used in connection with ammonia to form a binary liquid appropriate for use in refrigerating machinery.

I am aware that ordinary ether has been proposed as an absorbent for ammonia; but the absorption is so limited in degree, even when effected under considerable pressure, as to be practically of no utility.

I am also aware that glycerine, either alone or diluted with alcohol, absorbs large quantities of ammonia, and when thus combined and submitted to a partial vacuum allows the ammonia to escape and vaporize, producing intense cold thereby; but the glycerine itself, not being volatile, is not capable of following the ammonia through the pump and compressor into the condenser, as it is important that the absorbent should, and consequently necessitates the employment of costly mechanical devices by which to effect the reabsorption of the liberated ammonia by the glycerine, thus materially counteracting the otherwise manifest advantages of the process.

My invention consists in the use of one of the compound ammonias or amines—such as one of the three ethylamines, or one of the three methylamines—in combination with a highly-volatile liquid or gas—such as ammonia—united to form a binary liquid, which is to be employed in suitable apparatus, similar to that at present well known for the production of low temperatures—that is to say, substantially by introducing said binary liquid into a chamber, in which it will be relieved sufficiently from the normal pressure to allow the said amine and the gas or liquid held by it in solution to vaporize, thus absorbing heat, and from said refrigerating-chamber forcing both the vapors thus liberated through suitable mechanism to a condenser, in which they are subjected to a sufficient pressure to again reduce the amine to a liquid state, thereby causing it to reabsorb the more volatile vapor.

The accompanying drawing indicates a plan of an apparatus in which my new binary liquid might be utilized in the manner above designated for the manufacture of ice, or for other refrigerating purposes.

In the said drawing, R represents the refrigerating-chamber in which the binary liquid is vaporized, and from which the vapors are withdrawn by a double-acting pump, P, by which they are also forced into the condenser C and compressed. A pump, $p'$, causes the circulation of a cooling-liquid around the condenser C, from which the reunited binary liquid is returned to the refrigerating-chamber by means of the connection $c$. A non-congealable liquid is caused to circulate around the refrigerating-chamber R, and through a cooling-tank, T, or through suitable refrigerating-pipes, by means of a pump, $p^2$.

Other well-known forms of apparatus, or apparatus designed for special purposes, may be used in conjunction with my new binary liquid, the drawing being designed simply to illustrate a practicable means of carrying my invention into effect.

I have discovered that the liquids known as the "compound ammonias" or "amines" are especially adapted to form, in connection with ammonia, a suitable binary liquid for the purpose set forth, since they are all capable of absorbing ammoniacal gas in large quantities. Of the class of compound ammonias I prefer to employ trymethylamine, on account of its cheapness and ease of production industrially; but the other amines may also be advantageously employed. The absorbent, for instance, might contain dimethylamine, monomethylamine, and ethylamine, since their points of ebullition are nearly the same, and since they all absorb ammoniacal gas. As an absorbent the trimethylamine possesses manifest advantages over ether. It is much more volatile, its boiling-point being about 50° Fahrenheit, in contradistinction to about 95° Fahrenheit for ether, and when saturated, even moderately, with ammonia-gas the liquid is absolutely uninflammable. The trimethylamine, at a temperature of 50° Fahrenheit, will absorb as much as three hundred and sixty-two times its own volume of ammonia-gas, which it will readily abandon under a reduction of pressure, while at the same time becoming itself volatilized. An elevation of the temperature above, say, 50° Fahrenheit would also produce the same result, although if confined in a closed chamber the pressure of the mixed liquid does not exceed about forty pounds in pressure to the square inch at a temperature of about 80° Fahrenheit. The advantages of this binary liquid for use in refrigerating-machines will thus be obvious, since with a like amount of energy expended I can produce in the same apparatus a greater degree of cold than it is now possible to produce by the use of the sulphurous dioxide and ether or other binary liquid under like circumstances. The ammonia will, during vaporization, absorb about five times as much heat as the binary liquid composed of ethyl sulphurous dioxide under like circumstances. The pressure necessary to liquefy the above old binary compound and my new compound herein described is about the same—say from thirty to forty pounds per square inch. With my compound, however, a greater degree of cold can be produced in the same machine than can be obtained by the use of any old binary liquid. I find that a binary liquid containing, by weight, about thirty to forty pounds of ammonia, and about sixty to seventy pounds of trimethylamine, also by weight, gives good results; but these proportions may be varied from, as circumstances may require.

I make my new binary liquid in the following manner: The liquid trimethylamine, which can be obtained by any of the now well-known methods, is placed in a suitable vessel and kept at a temperature of about 50° Fahrenheit. A pipe reaches nearly to the bottom of this vessel and conveys into it a current of anhydrous gaseous ammonia prepared by any of the well-known methods. The globules of gas as fast as they come in contact with the trimethylamine are readily absorbed and considerable heat is generated. The vessel in which is placed the trimethylamine is provided with cocks, valves, and a gage, and when the absorption is carried on only below the atmospheric pressure. The gage, when it indicates a pressure above the usual atmospheric pressure, shows that the gaseous ammonia should be cut off, and another vessel containing non-saturated trimethylamine should be substituted for the one containing the saturated liquid. The ammonia-gas used need not be perfectly free from water. Should it contain small amounts of water, no bad results would be obtained, since both the ammonia and the trimethylamine are soluble in water. The ammonia would in this case be absorbed by the trimethylamine, which would contain a small percentage of water, and which would have no other effect than to reduce in a degree the volatility of the absorbent liquid.

What I claim, and desire to secure by Letters Patent, is—

1. A binary liquid composed of one of the compound ammonias or amines and an absorbed and more highly volatile substance.

2. A binary liquid composed of one of the compound ammonias or amines and liquid or gaseous ammonia.

3. The process of producing cold for the manufacture of ice and for other purposes, the same consisting in causing volatilization by means of a vacuum or partial vacuum from a binary liquid composed of one of the compound ammonias or amines as an absorbent, and a volatile absorbed material having affinity therefor, re-forming the binary liquid by restoration of pressure and the affinity of the gas or vapor of the absorbed material for the absorbent, and repeating the operations continuously, substantially as described.

4. The process of producing cold for the manufacture of ice and for other purposes, which consists in volatilizing a binary liquid, of which one component is a compound ammonia or amine, and the other gaseous ammonia or a substance which is capable of being held in absorption by its affinity therefor, and which is practically uncongealable, restoring the binary liquid thus constituted by the condensation of the absorbent compound ammonia or amine and the absorption of the other, and repeating the operation continuously, substantially as described.

JAMES C. ROSSI.

Witnesses:
  E. GILLET,
  H. HOOKER.